United States Patent
Chen et al.

(10) Patent No.: US 9,825,550 B1
(45) Date of Patent: Nov. 21, 2017

(54) BI-DIRECTIONAL POWER CONVERTER FOR CONVERTING POWER BETWEEN ALTERNATING CURRENT AND DIRECT CURRENT

(71) Applicant: COTEK ELECTRONIC IND. CO., LTD, Taoyuan (TW)

(72) Inventors: Wei-Kuang Chen, Taoyuan (TW); Chun-Wei Wu, Taoyuan (TW)

(73) Assignee: COTEK ELECTRONIC IND. CO., LTD, Taoyuan (TW)

( * ) Notice: Subject to any disclaimer, the term of this patent is extended or adjusted under 35 U.S.C. 154(b) by 0 days.

(21) Appl. No.: 15/340,959

(22) Filed: Nov. 1, 2016

(51) Int. Cl.
*H02M 1/14* (2006.01)
*H02M 3/335* (2006.01)
*H02M 5/458* (2006.01)

(52) U.S. Cl.
CPC .............. *H02M 5/458* (2013.01); *H02M 1/14* (2013.01); *H02M 3/33584* (2013.01)

(58) Field of Classification Search
CPC ... H02M 2001/0067; H02M 2001/007; H02M 1/12; H02M 1/14; H02M 1/143; H02M 1/15; H02M 1/32; H02M 3/156; H02M 3/158; H02M 5/458; H02M 5/4585; H02M 7/537; H02M 7/5387; H02M 7/53871; H02M 7/66; H02M 7/68; H02M 7/757
USPC .......... 363/13, 34, 37, 50, 52, 53, 55, 56.01, 363/56.02, 56.03, 56.04, 56.05; 361/1, 2, 361/5, 6, 7, 15, 18, 35, 36, 88, 89, 90
See application file for complete search history.

(56) References Cited

U.S. PATENT DOCUMENTS

| | | | | |
|---|---|---|---|---|
| 6,330,170 B1 * | 12/2001 | Wang | ...................... | H02J 9/062 363/17 |
| 7,796,410 B2 * | 9/2010 | Takayanagi | ........... | H02J 7/0013 307/66 |
| 8,842,451 B2 * | 9/2014 | Phadke | ................... | H02J 3/383 363/37 |
| 2007/0086222 A1 * | 4/2007 | Iida | ......................... | H02J 7/022 363/37 |
| 2007/0296383 A1 * | 12/2007 | Xu | .......................... | H02M 1/14 323/282 |
| 2008/0062724 A1 | 3/2008 | Feng | | |
| 2012/0013192 A1 * | 1/2012 | Park | ....................... | H02J 3/383 307/80 |
| 2012/0074949 A1 * | 3/2012 | Kepley | ............. | H02M 3/33584 324/426 |

(Continued)

*Primary Examiner* — Jeffrey Gblende
*Assistant Examiner* — David A. Singh
(74) *Attorney, Agent, or Firm* — Winston Hsu

(57) ABSTRACT

A bi-directional power converter includes a first terminal, a second terminal, a third terminal, a fourth terminal, a first converter, a second converter, a power driver, and a processor. The first converter is coupled to the first terminal and the second terminal for performing a conversion between a first alternating current and a first direct current. The second converter is coupled to the first converter for performing a conversion between a second alternating current and the first direct current. The power driver is coupled to the second converter, the third terminal and the fourth terminal for performing a conversion between the second alternating current and a second direct current. The processor is coupled to the first converter, the second converter, and the power driver for controlling the first converter, the second converter, and the power driver.

18 Claims, 15 Drawing Sheets

(56) References Cited

U.S. PATENT DOCUMENTS

2012/0300502 A1* 11/2012 Shimada ............. H02M 1/4258
 363/17
2015/0372584 A1* 12/2015 Hirota .................... H02M 1/15
 363/37

* cited by examiner

US 9,825,550 B1

BI-DIRECTIONAL POWER CONVERTER FOR CONVERTING POWER BETWEEN ALTERNATING CURRENT AND DIRECT CURRENT

BACKGROUND OF THE INVENTION

1. Field of the Invention

The present invention illustrates a power converter, and more particularly, a bi-directional power converter for converting power between an alternating current and a direct current.

2. Description of the Prior Art

With advancement of techniques, various electronic devices having different driving power requirements are adopted in our daily life. Some electronic devices require a direct current to drive functions. For example, a smart phone or a notebook generally uses the direct current generated from their batteries for driving functions. Some electronic devices require an alternating current to drive functions. For example, a television or a refrigerator uses the alternating current for driving functions. Actually, many electric appliances have alternating current plugs. A user can insert an alternating current plug into a socket. Then, the electric appliance can connect to an electrical grid for draining the alternating current. Specifically, the alternating current is an electric current in which the flow of electric charges periodically reverses direction. Generally, the waveform of alternating current in most electric power circuits is a sine wave. Thus, the alternating current is typically used for power transmission or power driving at a high frequency. Particularly, the direct current is the unidirectional flow of electric charges. In other words, the direct current flows in a constant direction. The direct current can be produced by power sources such as batteries, power supplies, thermocouples, solar cells, or dynamos.

To improve operation convenience, some power converters can output the direct current from the alternating current. For example, a battery charger can be used for converting the alternating current from the electrical grid to the direct current in order to charge a lithium battery in the smart phone. A power inverter can be used for converting the direct current to the alternating current. For example, solar power plants can generate direct currents by using the solar energy. Then, the solar power plants can be connected to the power inverter for outputting alternating currents which can be generally used for common electric appliances.

However, aforementioned power converters are categorized as unidirectional power converters. When a power converter is designed as a bi-directional power converter, it is required that an intact circuit of power charger and an intact circuit of power inverter are combined in conjunction with a switch for selecting to drive the power charger circuit or the power inverter circuit. Since the conventional bi-directional power converter requires the intact circuit of power charger and the intact circuit of power inverter, a circuit size of the conventional bi-directional power converter cannot be reduced. Further, since the conventional bi-directional power converter may perform asymmetric input/output power conversion, the conventional bi-directional power converter may waste additional power.

SUMMARY OF THE INVENTION

In an embodiment of the present invention, a bi-directional power converter is disclosed. The bi-directional power converter comprises a first terminal, a second terminal, a third terminal, a fourth terminal, a first converter, a second converter, a power driver, and a processor. The first converter is coupled to the first terminal and the second terminal and configured to perform a conversion between a first alternating current and a first direct current. The second converter is coupled to the first converter and configured to perform a conversion between a second alternating current and the first direct current. The power driver is coupled to the second converter, the third terminal and the fourth terminal and configured to perform a conversion between the second alternating current and a second direct current. The processor is coupled to the first converter, the second converter, and the power driver and configured to control the first converter, the second converter, and the power driver. When the first terminal and the second terminal receive the first alternating current, the third terminal and the fourth terminal output the second direct current. When the third terminal and the fourth terminal receive the second direct current, the first terminal and the second terminal output the first alternating current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
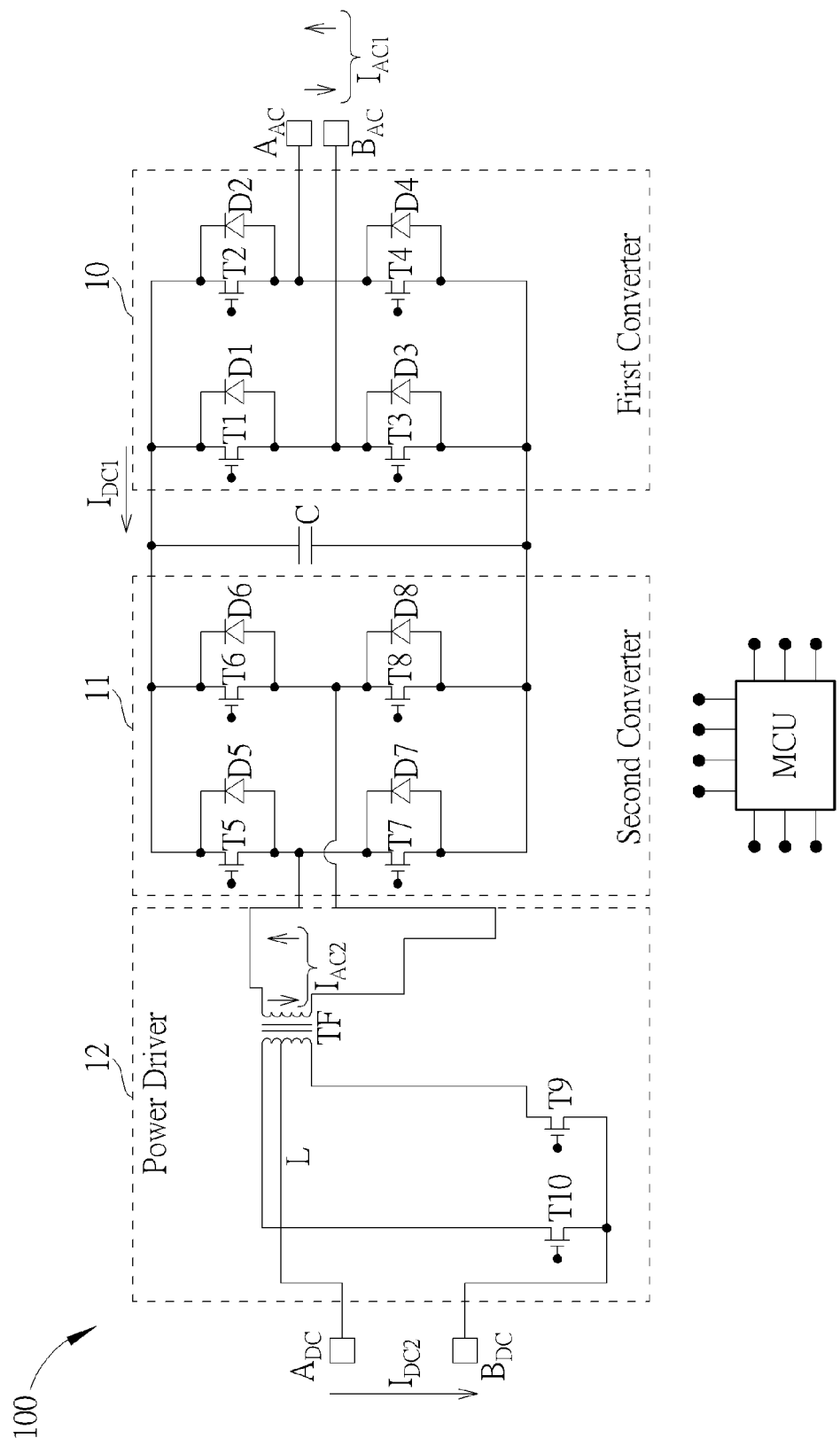
FIG. 1 illustrates a circuit structure of a bi-directional power converter according to an embodiment of the present invention.

FIG. 1 illustrates a circuit structure of a bi-directional power converter 100. The bi-directional power converter 100 includes a first terminal $A_{AC}$, a second terminal $B_{AC}$, a third terminal $A_{DC}$, a fourth terminal $B_{DC}$, a first converter 10, a second converter 11, a power driver 12, and a processor MCU. The first converter 10 is coupled to the first terminal $A_{AC}$ and the second terminal $B_{AC}$ for performing a power conversion between a first alternating current $I_{AC1}$ and a first direct current $I_{DC1}$. The second converter 11 is coupled to the first converter 10 for performing a power conversion between a second alternating current $I_{AC2}$ and the first direct current $I_{DC1}$. The power driver 12 is coupled to the second converter 11, the third terminal $A_{DC}$ and the fourth terminal $B_{DC}$ for performing a power conversion between the second alternating current $I_{AC2}$ and a second direct current $I_{DC2}$. The processor MCU is coupled to the first converter 10, the second converter 11, and the power driver 12 for controlling the first converter 10, the second converter 11, and the power driver 12. Specifically, when the first terminal $A_{AC}$ and the second terminal $B_{AC}$ receive the first alternating current $I_{AC1}$, the third terminal $A_{DC}$ and the fourth terminal $B_{DC}$ output the second direct current $I_{DC2}$. In other word, when the bi-directional power converter 100 performs alternating current to direct current conversion (i.e., AC-DC power conversion), the first alternating current $I_{AC1}$ is converted to the first direct current $I_{DC1}$. Then, the first direct current $I_{DC1}$ is converted to the second alternating current $I_{AC2}$. Finally, the second alternating current $I_{AC2}$ is converted to the second direct current $I_{DC2}$. As a result, three power transitions are introduced to generate the second direct current $I_{DC2}$ from the first alternating current $I_{AC1}$. When the third terminal $A_{DC}$ and the fourth terminal $B_{DC}$ receive the second direct current $I_{DC2}$, the first terminal $A_{AC}$ and the second terminal $B_{AC}$ output the first alternating current $I_{AC1}$. In other words, when the bi-directional power converter 100 performs direct current to alternating current conversion (i.e., DC-AC power conversion), the second direct current $I_{DC2}$ is converted to the second alternating current $I_{AC2}$. Then, the second alternating current $I_{AC2}$ is converted to the first direct current $I_{DC1}$. Finally, the first direct current $I_{DC1}$ is converted to the first alternating current $I_{AC1}$. As a result, three power transitions are introduced to generate the first alternating current $I_{AC1}$ from the second direct current $I_{DC2}$. In the bi-directional power converter 100, the first converter 10 and the second converter 11 can be two H-bridge converters or two half-H-bridge converters. The first converter 10 and the second converter 11 can also be one H-bridge converter connected to one half-H-bridge converter. However, the first converter 10 and the second converter 11 in the embodiment are not limited to bridge-based converters. For example, any reasonable hardware modification of the first converter 10 or the second converter 11 in FIG. 1 falls into the scope of the present invention. The power driver 12 can be a push-pull circuit or a fly-back circuit capable of power conversion.

In the bi-directional power converter 100, the first terminal $A_{AC}$ and the second terminal $B_{AC}$ can be used for outputting the first alternating current $I_{AC1}$ satisfying an electrical grid standard. For example, the first alternating current $I_{AC1}$ outputted from the first terminal $A_{AC}$ and the second terminal $B_{AC}$ has a central frequency substantially equal to 50 Hz or 60 Hz. The tolerance frequency in the bi-directional power converter 100 is equal to 3 Hz so that a frequency range of the first alternating current is substantially equal to 47 Hz-53 Hz or 57 Hz-63 Hz. Further, the power of the first alternating current $I_{AC1}$ and power of the second direct current $I_{DC2}$ during a time interval are substantially equal. For example, when the bi-directional power converter 100 performs an AC-DC power conversion or a DC-AC power conversion, power of the first terminal $A_{AC}$ and the second terminal $B_{AC}$ (i.e., two terminals for inputting/outputting alternating current) can correspond to 2000 watts during the time interval, and the third terminal $A_{DC}$ and the fourth terminal $B_{DC}$ (i.e., two terminals for inputting/outputting direct current) can correspond to 1700 to 2000 watts during the time interval. Thus, density or efficiency of power conversion can be increased since only slight power consumption is introduced to the bi-directional power converter 100. In practice, power conversion efficiency of the bi-directional power converter 100 can be greater than 85% because only three power transitions are introduced. Here, circuit structure of each block of the bi-directional power converter 100 is illustrated below. However, any reasonable hardware modification of the bi-directional power converter 100 falls into the scope of the present invention.

In the bi-directional power converter 100, the first converter includes a first transistor T1, a first diode D1, a second transistor T2, a second diode D2, a third transistor T3, a third diode D3, a fourth transistor T4, and a fourth diode D4. Transistors of the first converter 10 can be metal-oxide-semiconductor field effect transistors. Diodes of the first converter 10 can be body diodes. The first transistor T1 includes a first node, a second node coupled to the second terminal $B_{AC}$, and a control node coupled to the processor MCU. The first diode D1 includes a cathode coupled to the first node of the first transistor T1, and an anode coupled to the second node of the first transistor T1. The second transistor T2 includes a first node coupled to the first node of the first transistor T1, a second node coupled to the first terminal $A_{AC1}$ and a control node coupled to the processor MCU. The second diode D2 includes a cathode coupled to the first node of the second transistor T2, and an anode coupled to the second node of the second transistor T2. The third transistor T3 includes a first node coupled to the second node of the first transistor T1, a second node, a control node coupled to the processor MCU. The third diode D3 includes a cathode coupled to the first node of the third transistor T3, and an anode coupled to the second node of the third transistor T3. The fourth transistor T4 includes a first node coupled to the second node of the second transistor T2, a second node coupled to the second node of the third transistor T3, and a control node coupled to the processor MCU. The fourth diode D4 includes a cathode coupled to the first node of the fourth transistor T4, and an anode coupled to the second node of the fourth transistor T4.

In the bi-directional power converter 100, the second converter includes a fifth transistor T5, a fifth diode D5, a sixth transistor T6, a sixth diode D6, a seventh transistor T7, a seventh diode D7, an eighth transistor T8, and an eighth diode D8. The fifth transistor T5 includes a first node, a second node, and a control node coupled to the processor MCU. The fifth diode D5 includes a cathode coupled to the first node of the fifth transistor T5, and an anode coupled to the second node of the fifth transistor T5. The sixth transistor T6 includes a first node coupled to the first node of the fifth transistor T5, a second node, and a control node coupled to the processor MCU. The sixth diode D6 includes a cathode coupled to the first node of the sixth transistor T6, and an anode coupled to the second node of the sixth transistor T6. The seventh transistor T7 includes a first node coupled to the second node of the fifth transistor T5, a second node, and a control node coupled to the processor MCU. The seventh diode D7 includes a cathode coupled to the first node of the seventh transistor T7, and an anode coupled to the second node of the seventh transistor T7. The eighth transistor T8 includes a first node coupled to the second node of the sixth transistor T6, a second node coupled to the second node of the seventh transistor T7, and a control node coupled to the processor MCU. The eighth diode D8 includes a cathode coupled to the first node of the eighth transistor T8, and an anode coupled to the second node of the eighth transistor T8. Specifically, the first terminal of the first transistor T1, the first terminal of the second transistor T2, the first terminal of the fifth transistor T5, and the first terminal of the sixth transistor T6 are jointly coupled. The second terminal of the third transistor T3, the second terminal of the fourth transistor T4, the second terminal of the seventh transistor T7, and the second terminal of the eighth transistor T8 are jointly coupled. In the bi-directional power converter 100, a capacitor C can be optionally introduced for filtering power ripples. The capacitor C includes a first node coupled to the first node of the first transistor T1 and a second node coupled to the second node of the third transistor T3.

In the bi-directional power converter 100, the power driver 12 includes a transformer TF, a ninth transistor T9, a tenth transistor T10, and a signal line L. The transformer TF can be formed by two coils (i.e., for example, primary coil and secondary coil). The coil windings are not electrically connected but are only linked magnetically to perform electromagnetic induction of an alternating current. The ninth transistor T9 includes a first node coupled to the transformer TF, a second node, and control node coupled to the processor MCU. The tenth transistor T10 includes a first node coupled to the transformer TF, a second node coupled to the second node of the ninth transistor T9 and the fourth terminal $B_{DC}$, and a control node coupled to the processor MCU. The signal line L is coupled to the transformer TF and the third terminal $A_{DC}$. Specifically, the processor MCU controls the ninth transistor T9 and the tenth transistor T10 to operate the ninth transistor T9 and the tenth transistor T10 in the same frequency (i.e., for example, 30 KHz) and opposite phases. In other words, when the ninth transistor T9 is operated in open state (switched off), the tenth transistor T10 is operated in short state (switched on). On the contrary, when the ninth transistor T9 is operated in short state (switched on), the tenth transistor T10 is operated in open state (switched off).

In the bi-directional power converter 100, the processor MCU can control the transistors in the power driver 12 and the second converter 11 synchronously for improving the power conversion performance. As aforementioned illustrations, the bi-directional power converter 100 can perform DC-AC power conversion and AC-DC power conversion without sacrificing severe power consumption since only three power transitions are introduced. In the following, the method of AC-DC power conversion and the DC-AC power conversion is described.

Figure 2:
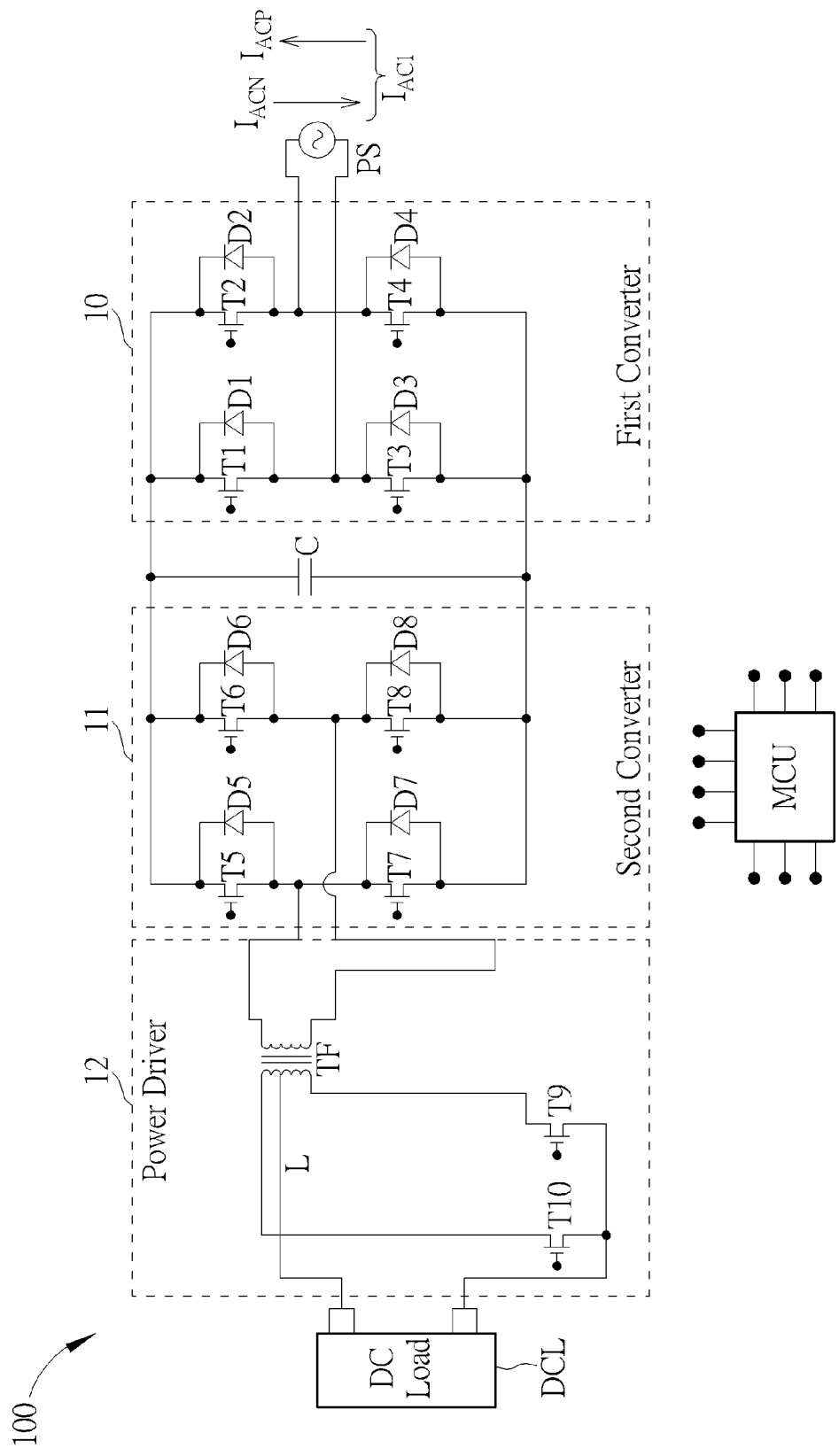
FIG. 2 illustrates the circuit structure of a bi-directional power converter when a first terminal and a second terminal receive a first alternating current.

FIG. 2 illustrates the circuit structure of a bi-directional power converter 100 when a first terminal $A_{AC}$ and a second terminal $B_{AC}$ receive a first alternating current $I_{AC1}$. In FIG. 2, the first alternating current $I_{AC1}$ can be generated from a power source PS, such as an electrical grid source. The first alternating current $I_{AC1}$ have two opposite polarities switching alternatively with a frequency (i.e., 50 Hz or 60 Hz for the electrical grid source). For presentation simplicity, the first alternating current $I_{AC1}$ with a positive polarity (or say, positive half-cycle) is denoted as alternating current $I_{ACP}$. The first alternating current $I_{AC1}$ with a negative polarity (or say, negative half-cycle) is denoted as alternating current $I_{ACN}$. The third terminal $A_{DC}$ and the fourth terminal $B_{DC}$ are coupled to a load DCL, such as a battery. For example, the bi-directional power converter 100 can output the second direct current $I_{DC2}$ for driving the load DCL for charging the battery. In FIG. 2, the first converter 10 and the second converter 11 are H-bridge converters. When the first terminal $A_{AC}$ and the second terminal $B_{AC}$ receive the first alternating current $I_{AC1}$, the processor MCU can control the first converter 10 to perform a power factor converter (PFC) function or a rectifier function. Specifically, when the first converter 10 performs the PFC function, the processor MCU can control the first transistor T1, the second transistor T2, the third transistor T3, and the fourth transistor T4 for improving a power factor which can be evaluated as a ratio of true power divided by reactive power. The first converter 10 can output the first direct current $I_{DC1}$ converted from the first alternating current $I_{AC1}$ with a high efficiency. When the first converter 10 performs the rectifier function, the processor MCU can control the first transistor T1, the second transistor T2, the third transistor T3, and the fourth transistor T4 to operate in the open state (i.e., turn OFF all transistors). Equivalently, the first converter 10 can be simplified as a bridge circuit with four diodes D1 to D4. The first converter 10 can also output the first direct current $I_{DC1}$ with a predetermined intensity converted from the first alternating current $I_{AC1}$. For presentation simplicity, the H-bridge based first converter 10 performing the rectifier function is illustrated below.

Figure 3:
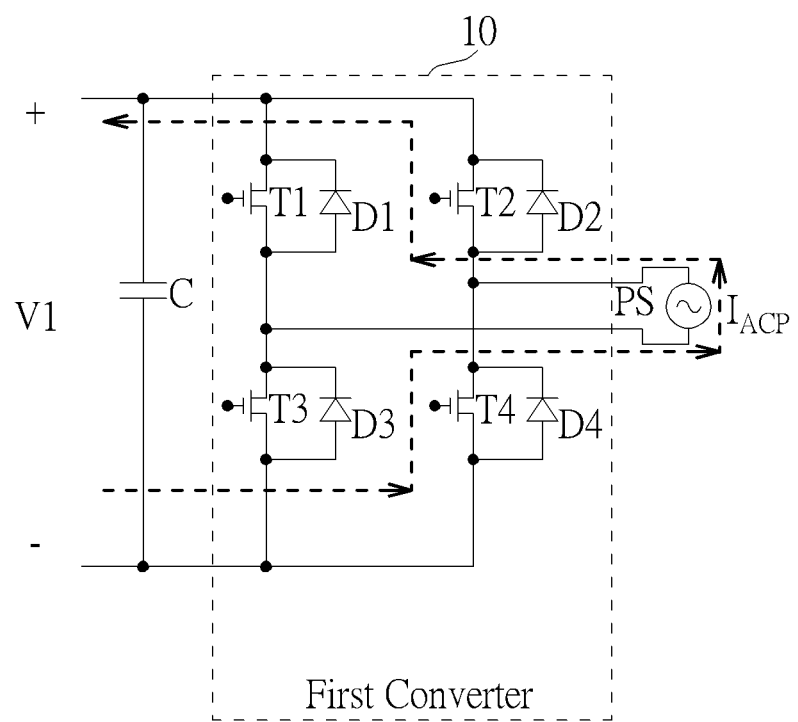
FIG. 3 illustrates a rectifier function of a first converter of the bi-directional power converter in FIG. 2 when the first alternating current is at a positive polarity.
Figure 4:
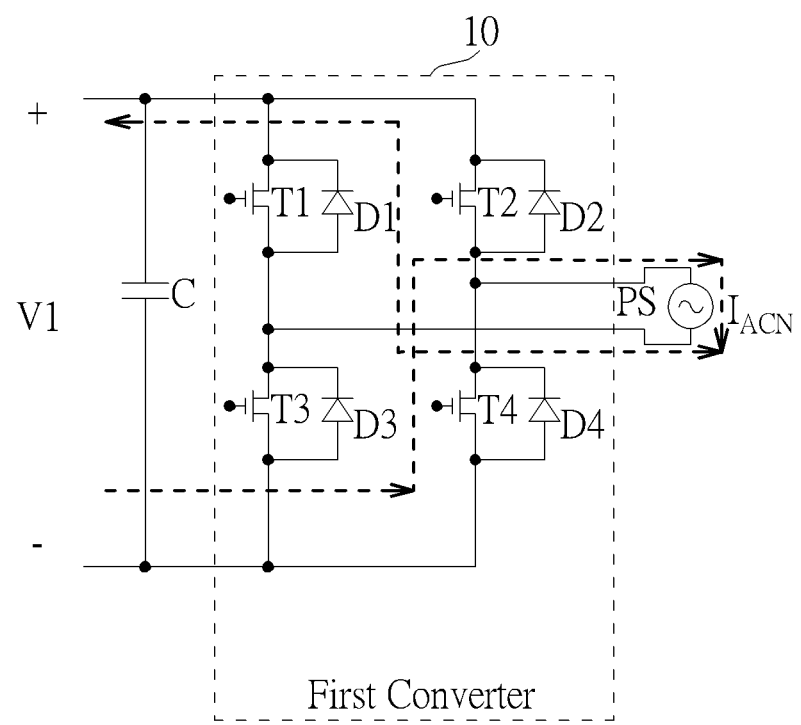
FIG. 4 illustrates the rectifier function of the first converter of the bi-directional power converter in FIG. 2 when the first alternating current is at a negative polarity.

FIG. 3 illustrates the rectifier function of the first converter 10 of the bi-directional power converter 100 when the first alternating current $I_{AC1}$ is at a positive polarity. According to the aforementioned definition, the first alternating current $I_{AC1}$ at a positive polarity is defined as the alternating current $I_{ACP}$. As known, a diode is unidirectional since a current through the diode only flows from anode to cathode. Thus, in FIG. 3, the alternating current $I_{ACP}$ flows from the second terminal of the capacitor C to the first terminal of the capacitor C through the third diode D3 and the second diode D2, thereby generating a unipolar voltage V1. FIG. 4 illustrates the rectifier function of the first converter 10 of the bi-directional power converter 100 when the first alternating current $I_{AC1}$ is at a negative polarity. According to the aforementioned definition, the first alternating current $I_{AC1}$ at a negative polarity is defined as the alternating current $I_{ACN}$. The alternating current $I_{ACN}$ flows from the second terminal of the capacitor C to the first terminal of the capacitor C through the fourth diode D4 and the first diode D1, thereby generating the unipolar voltage V1. Thus, the first converter 10 can perform full-wave AC-DC power conversion. In the next stage, the processor MCU controls the second converter 11 to perform an inverter function for achieving DC-AC power conversion. An embodiment of DC-AC power conversion method of the second converter 11 is illustrated below.

Figure 5:
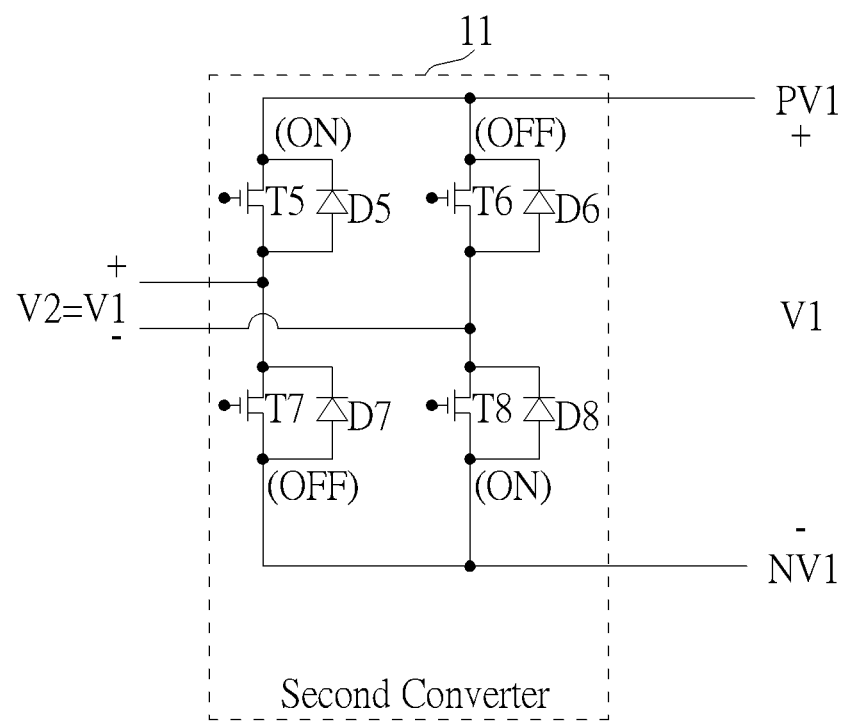
FIG. 5 illustrates a first operational condition of a second converter of the bi-directional power converter in FIG. 2.
Figure 6:
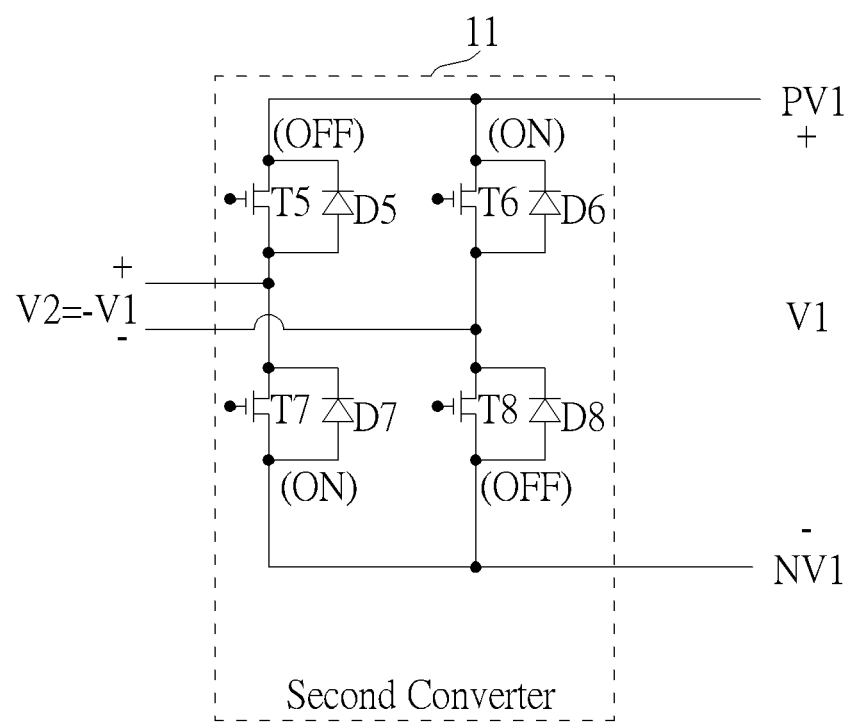
FIG. 6 illustrates a second operational condition of the second converter of the bi-directional power converter in FIG. 2.
Figure 7:
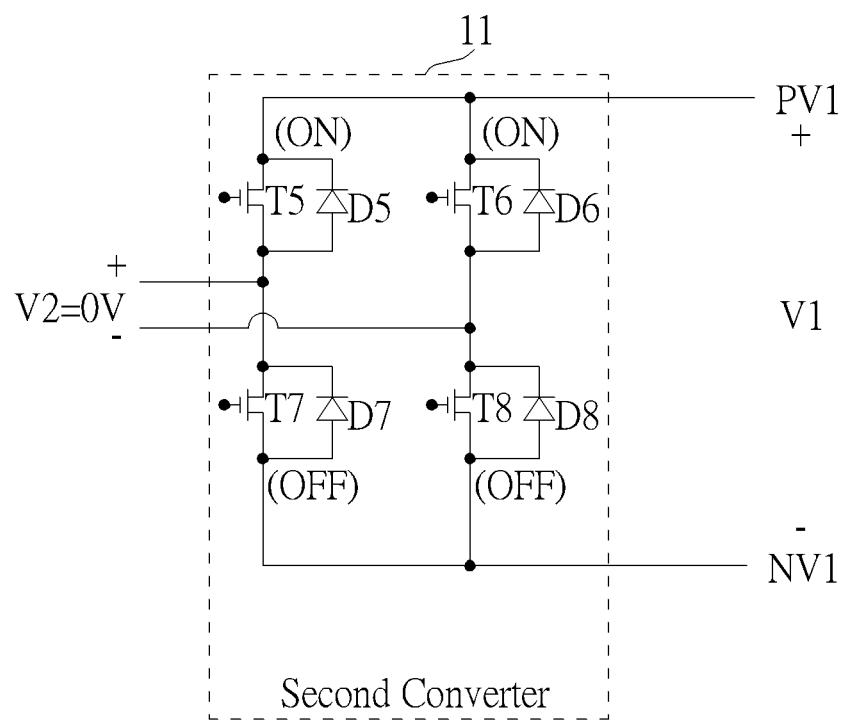
FIG. 7 illustrates a third operational condition of the second converter of the bi-directional power converter in FIG. 2.

FIG. 5 illustrates a first operational condition of the second converter 11 of the bi-directional power converter 100. In the first operational condition, the processor MCU controls the fifth transistor T5 and the eighth transistor T8 to operate in the short state. The processor MCU controls the sixth transistor T6 and the seventh transistor T7 to operate in the open state. At the moment, the second terminal of the fifth transistor T5 and a node PV1 are electrically coupled. The first terminal of the eighth transistor T8 and a node NV1 are electrically coupled. As a result, the polarity of a voltage V2 is the same as the polarity of the voltage V1. FIG. 6 illustrates a second operational condition of the second converter of the bi-directional power converter 100. In the second operational condition, the processor MCU controls the sixth transistor T6 and the seventh transistor T7 to operate in the short state. The processor MCU controls the fifth transistor T5 and the eighth transistor T8 to operate in the open state. At the moment, the second terminal of the fifth transistor T5 and the node NV1 are electrically coupled. The first terminal of the eighth transistor T8 and a node PV1 are electrically coupled. As a result, the polarity of a voltage V2 is opposite to the polarity of the voltage V1. FIG. 7 illustrates a third operational condition of the second converter 11 of the bi-directional power converter 100. In the third operational condition, the processor MCU controls the fifth transistor T5 and the sixth transistor T6 to operate in the short state. As a result, the second terminal of the fifth transistor T5 and the second terminal of the sixth transistor T6 are electrically coupled through the conductive transistors T5 and T6. Thus, a cross voltage V2 between the second terminal of the fifth transistor T5 and the second terminal of the sixth transistor T6 is equal to zero.

Figure 8:
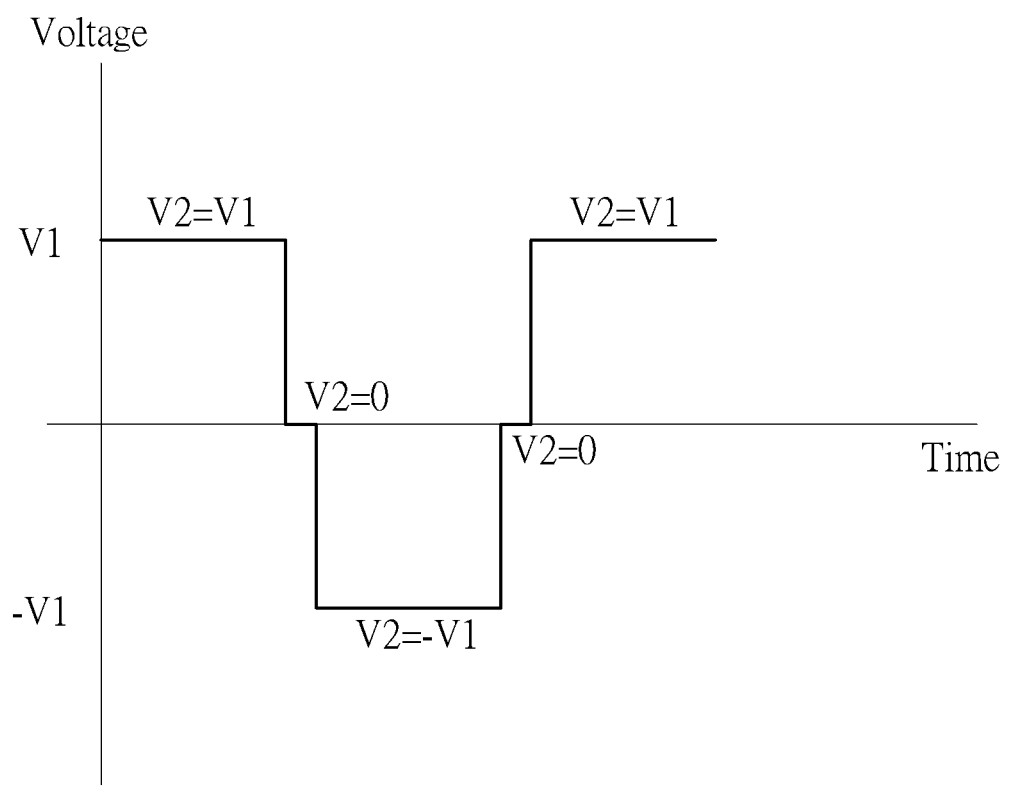
FIG. 8 illustrates a waveform of voltage outputted from the second converter of the bi-directional power converter in FIG. 2.

As aforementioned three states in FIG. 5 to FIG. 7, the processor MCU can control operational states of the fifth transistor T5, the sixth transistor T6, the seventh transistor T7, and the eighth transistor T8 for outputting the voltage V2 with a positive polarity, a negative polarity, or a zero-cross condition. FIG. 8 illustrates a waveform of voltage V2 outputted from the second converter 11 of the bi-directional power converter 100. As shown in FIG. 8, three operational conditions can be switched alternatively for generating the voltage V2 during a time interval. Particularly, the positive polarity and the negative polarity of the voltage V2 can be alternative with a predetermined frequency (i.e., for example, 30 KHz). By doing so, the second converter 11 can perform DC-AC power conversion. However, the DC-AC power conversion method of the second converter 11 is not limited to the method illustrated in FIG. 5 to FIG. 8. For example, the processor MCU can use more than three operational stages for outputting AC power. The processor MCU can also control the frequency and the amplitude of the voltage V2 outputted from the second converter 11. The second converter 11 can perform an inverter function. Any reasonable hardware or operation modification of the second converter 11 falls into the scope of the present invention.

Figure 9:
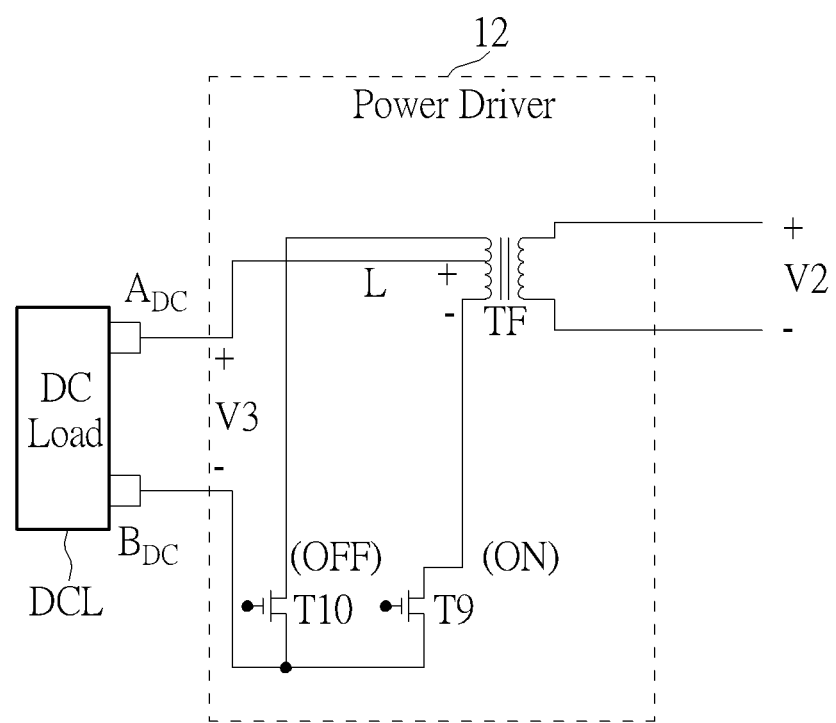
FIG. 9 illustrates the operation of a power driver of the bi-directional power converter in FIG. 2 when a voltage inputted to the power driver is at a positive polarity.
Figure 10:
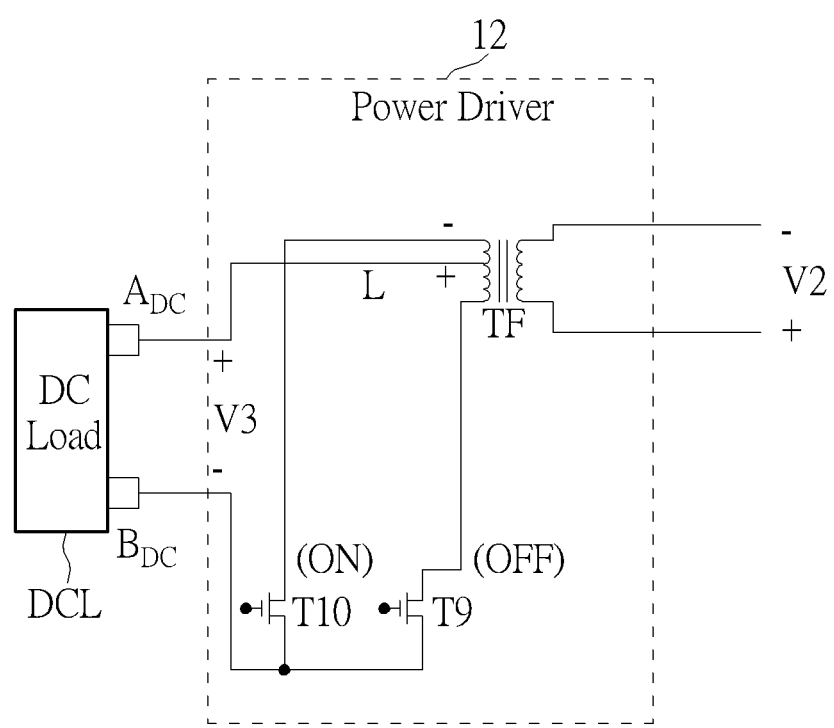
FIG. 10 illustrates the operation of the power driver of the bi-directional power converter in FIG. 2 when the voltage inputted to the power driver is at a negative polarity.

FIG. 9 illustrates the operation of a power driver 12 of the bi-directional power converter 100 when the voltage V2 inputted to the power driver 12 is at a positive polarity. FIG. 10 illustrates the operation of the power driver 12 of the bi-directional power converter 100 when the voltage V2 inputted to the power driver 12 is at a negative polarity. In FIG. 9, when the voltage V2 is at a positive polarity, the processor MCU can control the ninth transistor T9 to operate in the short state and the tenth transistor T10 to operate in the open state. Thus, a cross voltage (i.e., a voltage depends on an induced current of transformer windings) between the signal line L and the second terminal of the ninth transistor T9 has a positive polarity. Thus, a cross voltage V3 between the third terminal $A_{DC}$ and the fourth terminal $B_{DC}$ has a positive polarity. On the contrary, in FIG. 10, when the voltage V2 is at a negative polarity, the processor MCU can control the tenth transistor T10 to operate in the short state and the ninth transistor T9 to operate in the open state. Thus, a cross voltage between the signal line L and the second terminal of the tenth transistor T10 has a positive polarity. Thus, the cross voltage V3 between the third terminal $A_{DC}$ and the fourth terminal $B_{DC}$ has a positive polarity. Here, since the voltage V3 is a unipolar voltage, when a load DCL (i.e., for example, a battery) is coupled to the third terminal $A_{DC}$ and the fourth terminal $B_{DC}$, the second direct current $I_{DC2}$ is generated from the third terminal $A_{DC}$ to the fourth terminal $B_{DC}$ through the load DCL. As a result, the bi-directional power converter 100 can drive the load DCL (charge the battery) coupled to the third terminal $A_{DC}$ and the fourth terminal $B_{DC}$.

Figure 11:
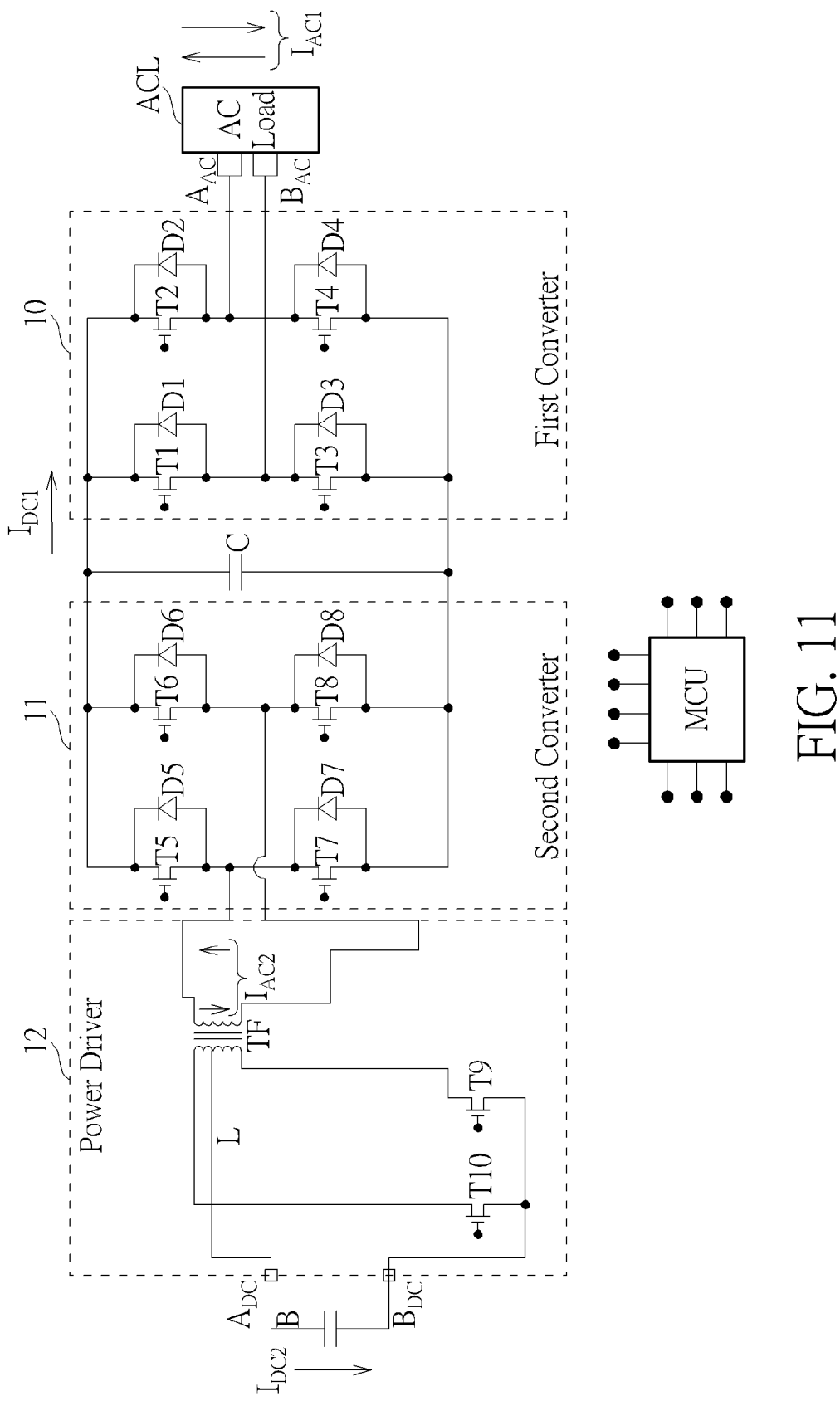
FIG. 11 illustrates the circuit structure of a bi-directional power converter when a third terminal and a fourth terminal receive a second direct current.

FIG. 11 illustrates the circuit structure of a bi-directional power converter 100 when a third terminal $A_{DC}$ and a fourth terminal $B_{DC}$ receive a second direct current $I_{DC2}$. In FIG. 11, the second direct current $I_{DC2}$ can be generated from a battery B. The second direct current $I_{DC2}$ is a unipolar current. The bi-directional power converter 100 can output the first alternating current $I_{AC1}$ between the first terminal $A_{AC}$ and the second terminal $B_{AC}$ for driving a load ACL. In FIG. 11, the first converter 10 and the second converter 11 are H-bridge converters illustrated in FIG. 2. When the third terminal $A_{DC}$ and the fourth terminal $B_{DC}$ receive the second direct current $I_{DC2}$, the processor MCU controls the first converter 10 to perform an inverter function. The processor can also control the second converter to perform a rectifier function. In other words, when the bi-directional power converter 100 performs DC-AC power conversion, the power driver 12 performs an inverse function of the power driver 12 illustrated in FIG. 9 and FIG. 10. The ninth transistor T9 and the tenth transistor T10 are operated in the same frequency (i.e., for example, 30 KHz) and opposite phases for outputting the second alternating current $I_{AC2}$ from the second direct current $I_{DC2}$. The second converter 11 can perform AC-DC power conversion by using the method illustrated in FIG. 3 and FIG. 4 for outputting the first direct current $I_{DC1}$ from the second alternating current $I_{AC2}$. The first converter 10 can perform DC-AC power conversion by using the method illustrated in FIG. 5 to FIG. 8 for outputting the first alternating current $I_{AC1}$ from the first direct current $I_{DC1}$. Similarly, the processor MCU can synchronously control the power driver 12 and the second converter 11 for improving power conversion efficiency. The processor MCU can control the power driver 12 to operate at a frequency equal to 30 KHz. The processor MCU can control the first converter 10 for outputting the first alternating current $I_{AC1}$ at a frequency substantially equal to 50 Hz or 60 Hz. By doing so, the bi-directional power converter 100 can be used for driving the load ACL coupled to the first terminal $A_{AC}$ and the second terminal $B_{AC}$.

Figure 12B:
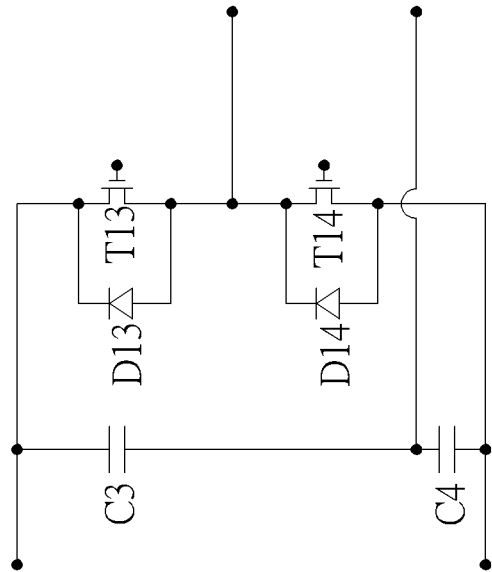
FIG. 12B illustrates a circuit structure of a half-H-bridge based first converter.
Figure 12A:
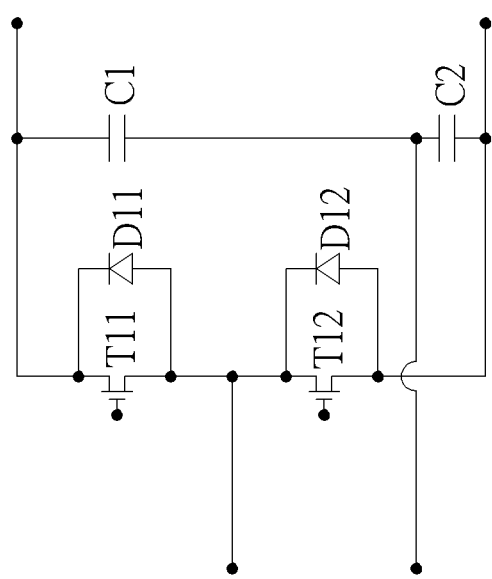
FIG. 12A illustrates a circuit structure of a half-H-bridge based second converter.

As aforementioned illustration, the first converter 10 and the second converter 11 can be two half-H-bridge converters. However, any regular or specific half-bridge based converter can be used to implement the first converter 10 or the second converter 11 and thus falls into the scope of the present invention. FIG. 12A illustrates a circuit structure of a half-H-bridge based second converter 11. FIG. 12B illustrates a circuit structure of a half-H-bridge based first converter 10. In FIG. 12A, the second converter 11 includes an eleventh transistor T11, an eleventh diode D11, a twelfth transistor T12, a twelfth diode D12, a first capacitor C1 and a second capacitor C2. The eleventh transistor T11 includes a first node, a second node, and a control node coupled to the processor MCU. The eleventh diode D11 includes a cathode coupled to the first node of the eleventh transistor T11, and an anode coupled to the second node of the eleventh transistor T11. The twelfth transistor T12 includes a first node coupled to the second node of the eleventh transistor T11, a second node, and a control node coupled to the processor MCU. The twelfth diode D12 includes a cathode coupled to the first node of the twelfth transistor T12, and an anode coupled to the second node of the twelfth transistor T12. The first capacitor C1 includes a first node coupled to the first node of the eleventh transistor T11, and a second node. The second capacitor C2 includes a first node coupled to the second node of the first capacitor C1, and a second node coupled to the second node of the twelfth transistor T12. Specifically, the eleventh transistor T11 and the twelfth transistor T12 are operated in the same frequency and opposite phases. Similarly, in FIG. 12B, the first converter 10 includes a thirteenth transistor T13, a thirteenth diode D13, a fourteenth transistor T14, a fourteenth diode D14, a third capacitor C3, and a fourth capacitor C4. The thirteenth transistor T13 includes a first node, a second node, and a control node coupled to the processor MCU. The thirteenth diode D13 includes a cathode coupled to the first node of the thirteenth transistor T13, and an anode coupled to the second node of the thirteenth transistor T13. The fourteenth transistor T14 includes a first node coupled to the second node of the thirteenth transistor T13, a second node, and a control node coupled to the processor MCU. The fourteenth diode D14 includes a cathode coupled to the first node of the fourteenth transistor T14, and an anode coupled to the second node of the fourteenth transistor T14. The third capacitor C3 includes a first node coupled to the first node of the thirteenth transistor T13, and a second node. The fourth capacitor C4 includes a first node coupled to the second node of the third capacitor C3, and a second node coupled to the second node of the fourteenth transistor T14. Specifically, the thirteenth transistor T13 and the fourteenth transistor T14 are operated in the same frequency and opposite phases.

Since the bi-directional power converter 100 provides dual power conversions and can control intensity of current outputted from the terminals $A_{AC}$ and $B_{AC}$ or terminals $A_{DC}$ and $B_{DC}$, some applications by using the bi-directional power converter 100 can provide high operation convenience and can be illustrated below.

Figure 13:
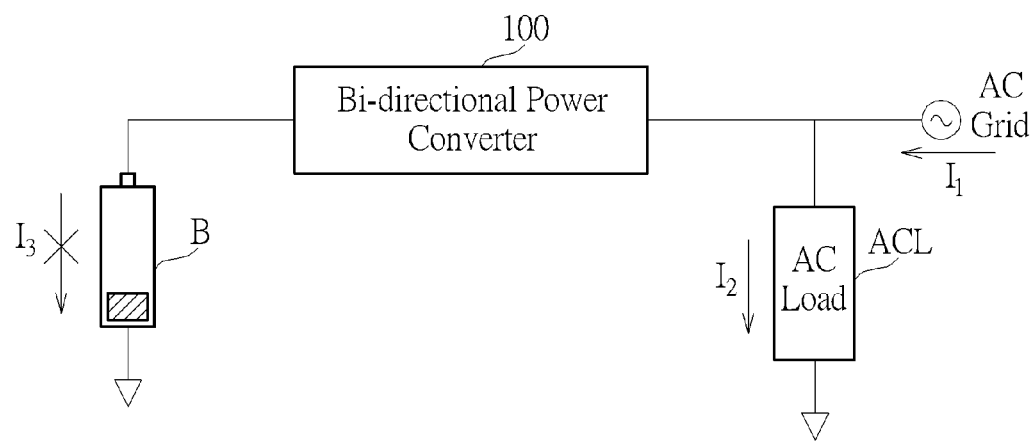
FIG. 13 illustrates an embodiment of a first application by using the bi-directional power converter in FIG. 1.

FIG. 13 illustrates an embodiment of a first application by using the bi-directional power converter 100. As shown in FIG. 13, an AC grid can be regarded as a power source. A load ACL can be regarded as an electric appliance driven by an alternating current $I_2$. A battery B can be regarded as a power bank. In FIG. 13, the load ACL requires the current $I_2$ for driving functions ($I_2$ can be 10 Ampere, hereafter, say "10 A"). The bi-directional power converter 100 can control a current $I_3$ equal to 0 A for inhibiting battery charging process. Thus, the AC grid can provide a current $I_1$ equal to 10 A for driving the load ACL. The battery B is operated in charging inhibition state. In other words, for the AC grid, it provides the current $I_1(10\ A)=I_2(10\ A)+I_3(0\ A)$ for driving the load ACL.

Figure 14:
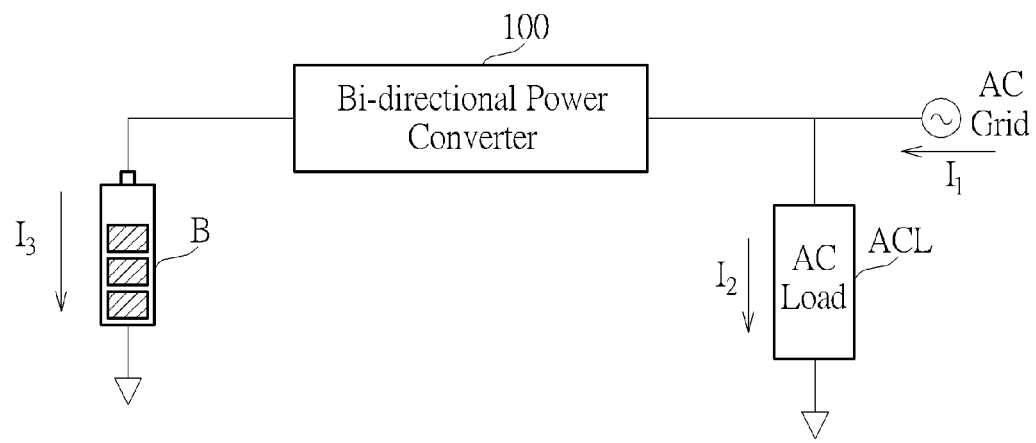
FIG. 14 illustrates an embodiment of a second application by using the bi-directional power converter in FIG. 1.

FIG. 14 illustrates an embodiment of a second application by using the bi-directional power converter 100. In FIG. 14, the load ACL requires a current $I_2$ equal to 10 A for driving functions. The bi-directional power converter 100 can control a current $I_3$ equal to 1 A for charging battery B. Thus, the AC grid can provide a current $I_1$ equal to 11 A for driving the load ACL and charging the battery B simultaneously. In other words, for the AC grid, it provides the current $I_1(11\ A)=I_2(10\ A)+I_3(1\ A)$ for driving the load ACL and charging the battery B simultaneously.

Figure 15:
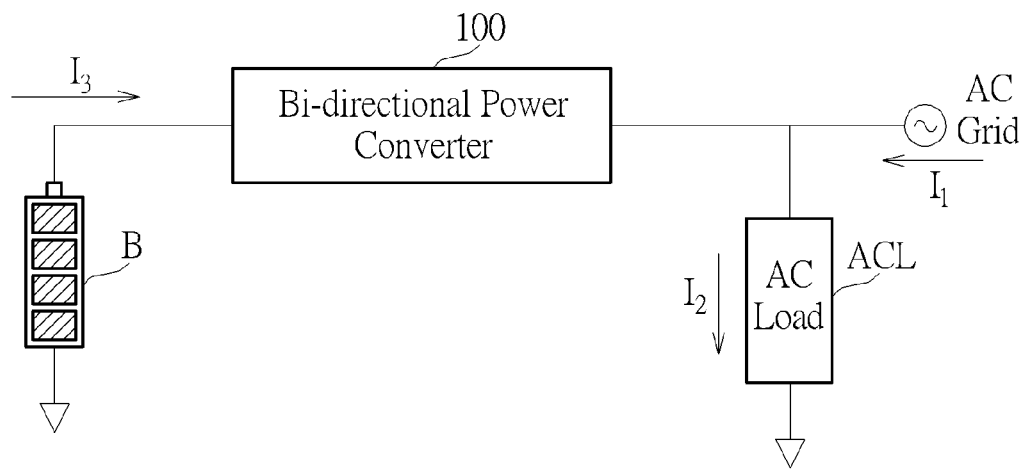
FIG. 15 illustrates an embodiment of a third application by using the bi-directional power converter in FIG. 1.

FIG. 15 illustrates an embodiment of a third application by using the bi-directional power converter 100. In FIG. 15, the load ACL requires a current $I_2$ equal to 10 A for driving functions. The bi-directional power converter 100 can control a current $I_3$ equal to 3 A from the battery B to the load ACL. Thus, the AC grid can provide a current $I_1$ equal to 7 A for driving the load ACL by combining the current $I_3$ equal to 3 A from the battery B. In other words, the AC grid and the battery B can provide power for jointly driving the load ACL. For the AC grid, it only provides the current $I_1(7\ A)=I_2(10\ A)-I_3(3\ A)$ for driving the load ACL.

Figure 16:
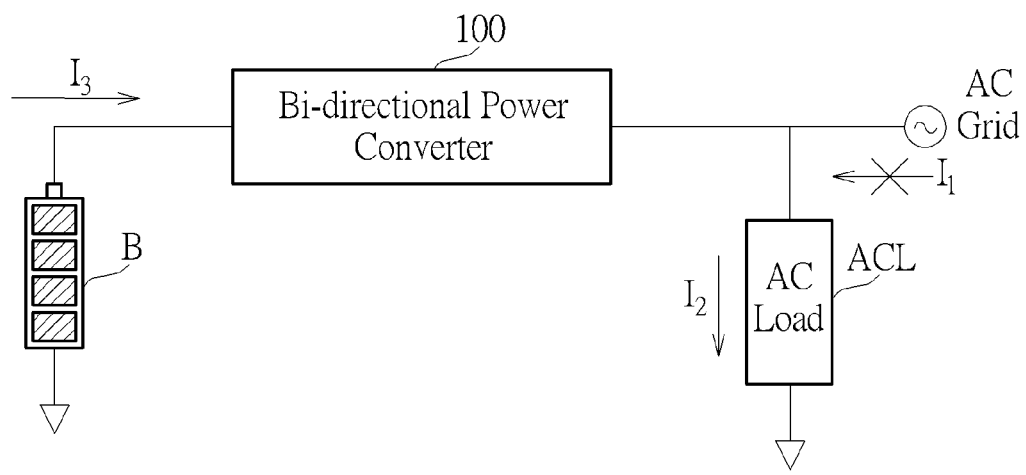
FIG. 16 illustrates an embodiment of a fourth application by using the bi-directional power converter in FIG. 1.

FIG. 16 illustrates an embodiment of a fourth application by using the bi-directional power converter 100. In FIG. 16, the load ACL requires a current $I_2$ equal to 10 A for driving functions. The bi-directional power converter 100 can control a current $I_3$ equal to 10 A from the battery B to the load ACL. Thus, the power from the AC grid is not required for driving the load ACL. As a result, no current is drained from the AC grid. In other words, the battery B can provide full power for driving the load ACL. For the AC grid, it is not required to provide the current $I_1(0\ A)=I_2(10\ A)-I_3(10\ A)$ since the battery B can completely drive the load ACL.

Figure 17:
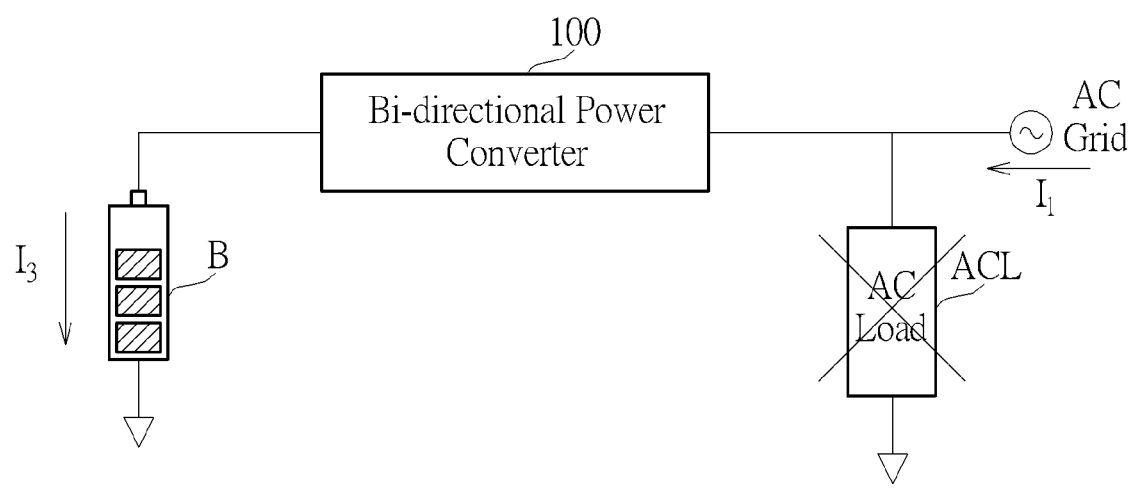
FIG. 17 illustrates an embodiment of a fifth application by using the bi-directional power converter in FIG. 1.

FIG. 17 illustrates an embodiment of a fifth application by using the bi-directional power converter 100. In FIG. 17, no load ACL is considered. Thus, the bi-directional power converter 100 can be used to transfer the AC power to the DC power for charging the battery B. For example, the AC grid can provide the current $I_1$ (10 A)=$I_2$(10 A) for charging the battery B.

In the present invention, the current can be controlled by the bi-directional power converter 100. For example, when the AC grid is limited to output a current equal to 5 A (i.e., $I_1$=5 A), the bi-directional power converter 100 can control the current $I_3$ for various current $I_2$ of the load ACL, as illustrated in Table A.

TABLE A

| current $I_2$ required by the load ACL | current $I_3$ of the battery B |
|---|---|
| 0A | 5A |
| 1A | 4A |
| 2A | 3A |
| 3A | 2A |
| 4A | 1A |
| 5A | 0A |
| 6A | −1A |
| 7A | −2A |

In Table A, since the AC grid is limited to output the current $I_1$ equal to 5 A, when the current $I_2$ required by the load ACL is increased (0 A to 5 A), the current $I_3$ of the battery B drained from the AC grid through the bi-directional power converter 100 is decreased (5 A to 0 A) for charging the battery B. When the current $I_2$ required by the load ACL (6 A and 7 A) is greater than the current $I_1$ limited by the AC grid (5 A), the battery B can discharge a power to the load ACL (i.e. the current $I_3$ is −1 A and −2 A). As a result, for the AC grid, the current $I_1$ can maintain to 5 A since $I_1(5\ A)=I_2(7\ A)+I_3\ (-2\ A)$ holds.

To sum up, the present invention discloses a bi-directional power converter for performing AC-DC power conversion or DC-AC power conversion. The bi-directional power converter only uses three power transitions for achieving power conversion. Specifically, the power of two direct current terminals and the power of two alternating current terminals during a time interval are substantially equal so that no additional power consumption is introduced when the power conversion is performed. Comparing the bi-directional power converter with conventional power converter, the bi-directional power converter of the present invention provides condensed circuits and high power density, thereby improving the convenience and efficiency of power conversion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bi-directional power system, comprising:
an alternating current grid configured to output a first alternating current;
a bi-directional power converter, comprising:
a first terminal coupled to the alternating current grid;
a second terminal coupled to the alternating current grid;
a third terminal;
a fourth terminal;
a first converter coupled to the first terminal and the second terminal and configured to perform a conversion between the first alternating current and a first direct current;
a second converter coupled to the first converter and configured to perform a conversion between a second alternating current and the first direct current;
a power driver coupled to the second converter, the third terminal and the fourth terminal and configured to perform a conversion between the second alternating current and a second direct current; and
a processor coupled to the first converter, the second converter, and the power driver and configured to control the first converter, the second converter, and the power driver; and
a battery coupled to the third terminal and the fourth terminal of the bi-directional power converter;
wherein when a required current for driving a power load is smaller than the first alternating current, the first terminal and the second terminal receive the first alternating current for driving the power load, the third terminal and the fourth terminal output the second direct current for charging the battery; and when a required current for driving the power load is greater than the first alternating current, the third terminal and the fourth terminal receive the second direct current generated by discharging the battery, and the alternating current grid, the first terminal and the second terminal jointly output the required current greater than the first alternating current for driving the power load.

2. The bi-directional power system of claim 1, wherein the first converter comprises:
a first transistor comprising:
a first node;
a second node coupled to the second terminal; and
a control node coupled to the processor;
a first diode comprising:
a cathode coupled to the first node of the first transistor; and
an anode coupled to the second node of the first transistor;
a second transistor comprising:
a first node coupled to the first node of the first transistor;
a second node coupled to the first terminal; and
a control node coupled to the processor;
a second diode comprising:
a cathode coupled to the first node of the second transistor; and
an anode coupled to the second node of the second transistor;
a third transistor comprising:
a first node coupled to the second node of the first transistor;
a second node; and
a control node coupled to the processor;
a third diode comprising:
a cathode coupled to the first node of the third transistor; and
an anode coupled to the second node of the third transistor;
a fourth transistor comprising:
a first node coupled to the second node of the second transistor;
a second node coupled to the second node of the third transistor; and
a control node coupled to the processor; and
a fourth diode comprising:
a cathode coupled to the first node of the fourth transistor; and
an anode coupled to the second node of the fourth transistor.

3. The bi-directional power system of claim 2, wherein the bi-directional power converter further comprises a capacitor having a first node coupled to the first node of the first transistor and a second node coupled to the second node of the third transistor.

4. The bi-directional power system of claim 1, wherein the first converter is an H-bridge converter or a half-H-bridge converter, when the first terminal and the second terminal receive the first alternating current, the processor controls the first converter to perform a power factor converter function or a rectifier function, and when the third terminal and the fourth terminal receive the second direct current, the processor controls the first converter to perform an inverter function.

5. The bi-directional power system of claim 1, wherein the second converter comprises:
a fifth transistor comprising:
a first node;
a second node; and
a control node coupled to the processor;
a fifth diode comprising:
a cathode coupled to the first node of the fifth transistor; and
an anode coupled to the second node of the fifth transistor;
a sixth transistor comprising:
a first node coupled to the first node of the fifth transistor;
a second node; and
a control node coupled to the processor;
a sixth diode comprising:
a cathode coupled to the first node of the sixth transistor; and
an anode coupled to the second node of the sixth transistor;
a seventh transistor comprising:
a first node coupled to the second node of the fifth transistor;
a second node; and
a control node coupled to the processor;

a seventh diode comprising:
  a cathode coupled to the first node of the seventh transistor; and
  an anode coupled to the second node of the seventh transistor;
an eighth transistor comprising:
  a first node coupled to the second node of the sixth transistor;
  a second node coupled to the second node of the seventh transistor; and
  a control node coupled to the processor; and
an eighth diode comprising:
  a cathode coupled to the first node of the eighth transistor; and
  an anode coupled to the second node of the eighth transistor.

6. The bi-directional power system of claim 1, wherein the second converter is an H-bridge converter or a half-H-bridge converter, when the first terminal and the second terminal receive the first alternating current, the processor controls the second converter to perform an inverter function, and when the third terminal and the fourth terminal receive the second direct current, the processor controls the second converter to perform a power factor converter function or a rectifier function.

7. The bi-directional power system of claim 1, wherein the power driver comprises:
  a transformer;
  a ninth transistor comprising:
    a first node coupled to the transformer;
    a second node; and
    a control node coupled to the processor;
  a tenth transistor comprising:
    a first node coupled to the transformer;
    a second node coupled to the second node of the ninth transistor and the fourth terminal;
    a control node coupled to the processor; and
  a signal line coupled to the transformer and the third terminal.

8. The bi-directional power system of claim 7, wherein the ninth transistor and the tenth transistor are operated in a same frequency and opposite phases.

9. The bi-directional power system of claim 1, wherein the power driver is a push-pull circuit or a fly-back circuit.

10. The bi-directional power system of claim 1, wherein power of the first alternating current and power of the second direct current during a time interval are substantially equal.

11. The bi-directional power system of claim 1, wherein when the first terminal and the second terminal receive the first alternating current, the first alternating current is processed by using three power transitions to become the second direct current.

12. The bi-directional power system of claim 1, wherein when the third terminal and the fourth terminal receive the second direct current, the second direct current is processed by using three power transitions to become the first alternating current.

13. The bi-directional power system of claim 1, wherein a center frequency of the first alternating current is substantially equal to 50 Hz or 60 Hz.

14. The bi-directional power system of claim 13, wherein a tolerance frequency of the first alternating current is substantially equal to 3 Hz.

15. The bi-directional power system of claim 1, wherein the second converter comprises:

an eleventh transistor comprising:
  a first node;
  a second node; and
  a control node coupled to the processor;
an eleventh diode comprising:
  a cathode coupled to the first node of the eleventh transistor; and
  an anode coupled to the second node of the eleventh transistor;
a twelfth transistor comprising:
  a first node coupled to the second node of the eleventh transistor;
  a second node; and
  a control node coupled to the processor;
a twelfth diode comprising:
  a cathode coupled to the first node of the twelfth transistor; and
  an anode coupled to the second node of the twelfth transistor;
a first capacitor comprising:
  a first node coupled to the first node of the eleventh transistor; and
  a second node; and
a second capacitor comprising:
  a first node coupled to the second node of the first capacitor; and
  a second node coupled to the second node of the twelfth transistor.

16. The bi-directional power system of claim 15, wherein the eleventh transistor and the twelfth transistor are operated in a same frequency and opposite phases.

17. The bi-directional power system of claim 1, wherein the first converter comprises:
  a thirteenth transistor comprising:
    a first node;
    a second node; and
    a control node coupled to the processor;
  a thirteenth diode comprising:
    a cathode coupled to the first node of the thirteenth transistor; and
    an anode coupled to the second node of the thirteenth transistor;
  a fourteenth transistor comprising:
    a first node coupled to the second node of the thirteenth transistor;
    a second node; and
    a control node coupled to the processor;
  a fourteenth diode comprising:
    a cathode coupled to the first node of the fourteenth transistor; and
    an anode coupled to the second node of the fourteenth transistor;
  a third capacitor comprising:
    a first node coupled to the first node of the thirteenth transistor; and
    a second node; and
  a fourth capacitor comprising:
    a first node coupled to the second node of the third capacitor; and
    a second node coupled to the second node of the fourteenth transistor.

18. The bi-directional power system of claim 17, wherein the thirteenth transistor and the fourteenth transistor are operated in a same frequency and opposite phases.

* * * * *